(12) United States Patent
Karlsson et al.

(10) Patent No.: US 6,915,360 B2
(45) Date of Patent: Jul. 5, 2005

(54) CELL BUFFERING SYSTEM WITH PRIORITY CACHE IN AN ATM SYSTEM

(75) Inventors: Magnus Karlsson, McKinney, TX (US); Gregory Lee Christison, McKinney, TX (US); Norayda Humphrey, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 720 days.

(21) Appl. No.: 09/827,808

(22) Filed: Apr. 6, 2001

(65) Prior Publication Data

US 2003/0208552 A1 Nov. 6, 2003

(51) Int. Cl.[7] ............ G06F 13/18; G06F 12/00
(52) U.S. Cl. ............ 710/40; 711/151; 710/39; 710/55
(58) Field of Search ............ 709/213; 710/39, 710/40, 42, 53, 55; 711/151, 156, 158

(56) References Cited

U.S. PATENT DOCUMENTS 6,401,145 B1 * 6/2002 Baskey et al. ............ 710/52
6,453,394 B2 * 9/2002 Miki et al. ............ 711/159
6,487,210 B1 * 11/2002 Janoska et al. ............ 370/412
6,539,024 B1 * 3/2003 Janoska et al. ............ 370/412
6,681,270 B1 * 1/2004 Agarwala et al. ............ 710/40

* cited by examiner

*Primary Examiner*—Gary Portka
(74) *Attorney, Agent, or Firm*—Abdul Zindani; W. James Brady, III; Frederick J. Telecky, Jr.

(57) ABSTRACT

The present invention provides an apparatus and system for buffering data in a communication network with an arranged priority which enables traffic shaping. A cell buffer unit (600) is arranged with a plurality of queues (614) configured to store PDUs on-chip and off-chip. There are associated queues both on-chip and off-chip for each priority queue. A cell buffer controller (620) forwards PDUs to a predetermined priority queue and manages the transfer of PDUs off-chip when a priority queue on-chip is fully occupied. The controller (620) also manages the transfer of PDUs from the off-chip queue when the on-chip priority queue becomes less than fully occupied.

20 Claims, 6 Drawing Sheets

CELL BUFFERING SYSTEM WITH PRIORITY CACHE IN AN ATM SYSTEM

CROSS REFERENCE TO RELATED APPLICATIONS

Cross reference is made to commonly assigned U.S. patent application Ser. No. 09/827,660 entitled "AAL2 Receiver For Filtering Signaling/Management Packets In An ATM System", U.S. patent application Ser. No. 09/827,816 entitled "AAL2 Transmitter For Voice-Packed and Signaling Management-Packed Interleaving On An ATM Connection", U.S. patent application Ser. No. 09/827,648 entitled "ATM Processor For Switching In An ATM System", and U.S. patent application Ser. No. 09/827,829 entitled "ATM System Architecture For The Convergence of Data, Voice and Video", the teaching of each of these applications being incorporated herein by reference and filed herewith.

BACKGROUND OF THE INVENTION

1. Technical Field of the Invention

The present invention relates generally to the field of telecommunications and, more particularly, to a data buffering architecture.

2. Description of Related Art

In order to improve the communication and resource sharing between computer systems, data communication networks having network communication protocols were introduced. A communication network may be a local area network (LAN), a wide area network (WAN) or have the properties of both LAN and WAN. The physical transmission medium of a communication network may be a wired type or network such as copper wire, fibre optics, or coaxial cable or a wireless type of network such as radio, infrared, or microwave.

As computer systems started to utilize more graphic images and video conferencing became more desirable, the communication of video data has become important over both LANs and WANs. While separate means for communication of video between end users could have been developed, it is desirable to simultaneously communication video data, audio data, and digital data across a LAN and a WAN.

Perhaps the most awaited, and now fastest growing technology in the field of telecommunications in the 1990's is known as Asynchronous Transfer Mode (ATM) technology. ATM is providing a mechanism for removing performance limitations of local area networks (LANs) and wide area networks (WANs) and providing data transfer at a speed of on the order of gigabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

In practice, ATM technology is presently being used primarily to pass data according to ATM adaptation layer (AAL) standards specification AAL1 (for circuit emulation—i.e. voice), AAL2 (voice over ATM) and specification AAL5 (for packetized data such as LAN traffic).

ATM originated as a telecommunication concept defined by the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Through a given ATM network the communication from one end system to another end system may have one or more logical paths in which a virtual connection could be made. The possible paths from one end system to another are referred to as the Virtual Paths (VP). Each virtual path may have one or more logical channels of communication which are referred to as Virtual Channels (VC). When a virtual channel is active it is often referred to as a virtual connection. Each VC has an associated identification number which is referred to as Virtual Channel Identifier (VCI). Each VP has an associated identification number which is referred to as Virtual Path Identifier (VPI).

ATM networks communicate using cell switching which is a form of Asynchronous time division multiplexing. The cell used in ATM are of a fixed length as opposed to packet switching which uses variable length data packets.

The ATM network architecture is generally organized in independent communication layers which are based on the OSI reference model. Briefly, some of the various functions performed at the communicant layers are described. The physical layer specifies the physical medium and transmission convergence where adaptation to the transmission interface occurs. The physical medium considers the bit timing that is required an the type of connectors, cabling, impedances, and protocol used at the physical medium. At the ATM layer generic flow control is considered, the cell header is generated or removed and passed to the respective next layer, the VPI/VCI address may be analyzed or translated and the ATM cells are multiplexed and demultiplexed as the case may be. At the ATM Adaptation Layer there is a segmentation and reassembly sublayer (SAR). The SAR sublayer provides for the segmentation of protocol data units (PDUs) into ATM cells or assembles ATM cells into PDUs that are passed to the higher layer.

The ATM technology is particularly well suited for communications among computers over the worldwide and public medium commonly referred to as the Internet, because of the flexibility and recoverability provided by this packet-based approach. A relatively recent technology by way of which remote, home, or small office workstations can now connect to the Internet is referred to in the art as digital subscriber loop ("DSL"). DSL refers generically to a public network technology that delivers relatively high bandwidth, far greater than current voice modem data rates, over conventional telephone company copper wiring at limited distance. As such, DSL modulator/demodulators ("modems") are now available for implementation with workstations and personal computers for ATM communications to and from the Internet, with data rates provided by DSL modems ranging from on the order of 500 Kbps to 18 Mbps or higher, according to conventional techniques.

The equipment required to implement traffic control in an ATM network comprising a plurality of communication channels is considerably complex. While brute force methods can be utilized to accomplish some of the desired complex tasks, such solutions are often too costly and/or inadequate to be feasible, particularly for small office/home office (SOHO) applications. Thus, elegant techniques for implementing SOHO ATM solutions are needed.

SUMMARY OF THE INVENTION

The present invention achieves technical advantages as an apparatus and system for buffering data in a communication network with an arranged priority which enables traffic shaping. A cell buffer unit is arranged with a plurality of queues configured to store PDUs on-chip and off-chip. There are associated queues both on-chip and off-chip for each priority queue. A cell buffer controller forwards PDUs to a predetermined priority queue and manages the transfer of PDUs off-chip when a priority queue on-chip is fully occupied. The controller also manages the transfer of PDUs from the off-chip queue when the on-chip priority queue becomes less than fully occupied.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
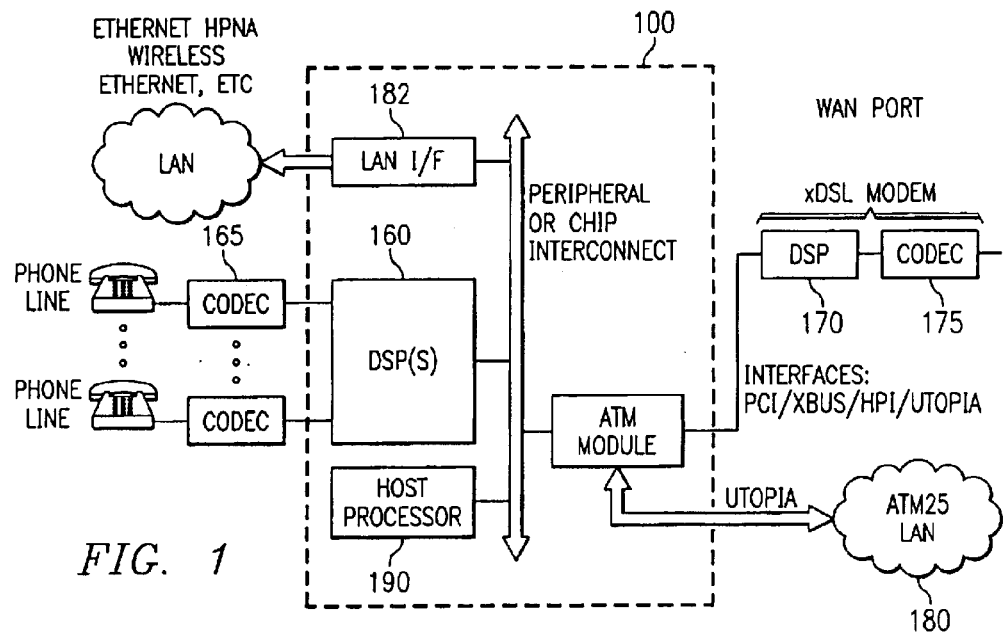
FIG. 1 illustrates a block diagram of an exemplary xDSL SOHO router/gateway system in accordance with an embodiment of the present invention.

Referring now to FIG. 1, there is illustrated a block diagram of an exemplary Asynchronous Transfer Mode (ATM) xDSL router/gateway 100 in accordance with an exemplary embodiment of the present invention. The xDSL router/gateway 100 includes a LAN interface 182 (Ethernet, HPNA, Wireless Ethernet, etc.), a phone line interconnect which generally includes a separate Codec 165 for each phone line and an associated DSP 160, a host or network processor 190 (such as a MIPS type processor), and an ATM module 101 which are all interconnected through a peripheral or chip interconnect. A DSP 160 can support multiple phone lines. The ATM module 101 is further coupled to an xDSL modem (which generally includes a DSP 170 and a Codec 175) and can be coupled to an ATM25 LAN 180. The coupling to the xDSL modem is through an interface such as PCI, HPI, XBUS or UTOPIA. The interface to the ATM25 LAN is through UTOPIA. The ATM module 101 can be integrated with the host processor 190, DSPs and LAN interfaces (Ethernet MAC, etc.) as a peripheral or as a stand-alone chip.

The peripheral or chip interconnect allows an external or embedded host processor 190 access to the xDSL router/gateway 100. Thus, the host processor 190 can initialize and configure the router/gateway 100 (e.g. enable functions, initialize DMAs with buffer pointers etc.) at start-up as well performing accesses to the router/gateway 100 during run-time. (The run-time tasks can include setting up and tearing down ATM connections, queuing packets for transmit, return buffers to DMAs, and service completion rings, etc.) For integration of the xDSL router/gateway 100 including the ATM module, the peripheral interconnect is preferably a VBUS. A VBUS is a Texas Instrument proprietary shared bus system with a central resource master/slave arrangement using "request" and "grants" through the central resource for interconnection. This interface could, however, be a standard interface (e.g. PCI) or a generic but proprietary interface (e.g. HPI or XBUS) for standalone module applications.

Figure 2:
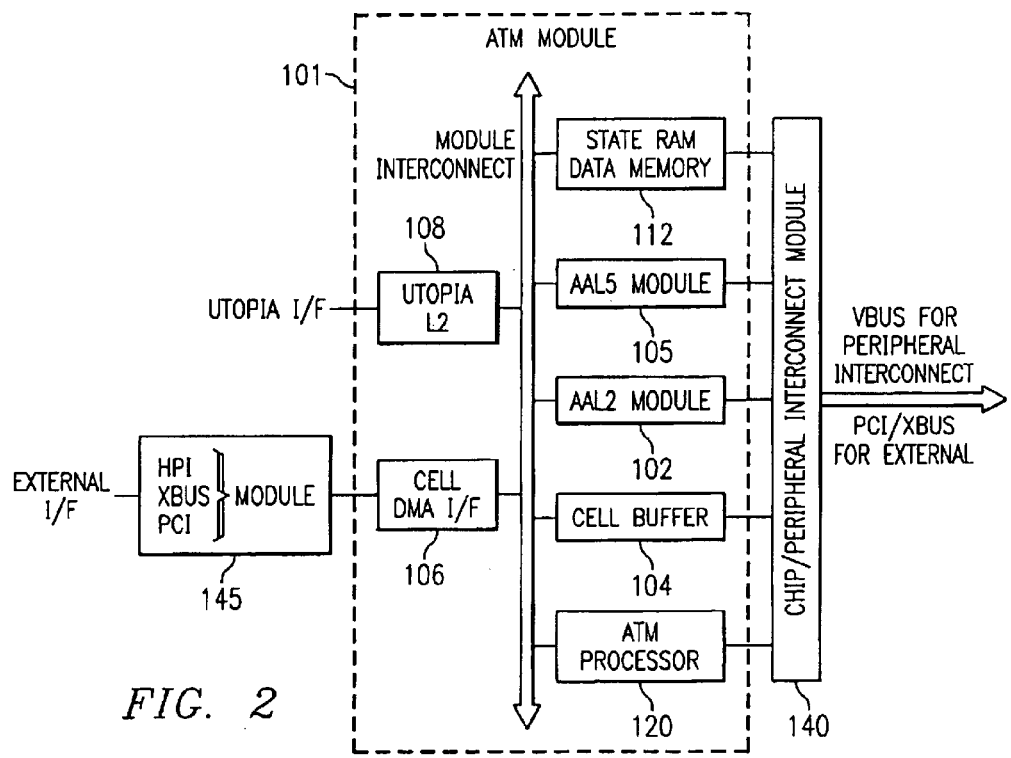
FIG. 2 illustrates a block diagram of an exemplary ATM module in accordance with an embodiment of the present invention.

Referring now to FIG. 2 there is illustrated a block diagram of an exemplary ATM module 101 in accordance with an embodiment of the present invention. The ATM module 101 includes a module interconnect in the form of a shared bus type arrangement with which all internal modules interface. The internal modules include the main processing module or ATM processor 120, UTOPIA L-2 module 108, Cell DMA I/F 106, Cell buffer module 104, AAL2 module 102, AAL5 module 105, and RAM module 112 which includes state RAM and data memory. The ATM processor is the master to all other modules on the peripheral interconnect. When the ATM module 101 is connected as a stand-alone chip, a chip/peripheral interconnect module 140 can be included to couple to a host processor system. Further, an interface module or HPI/XBUS/PCI module may be needed as an external interface with the cell DMA/IF 106.

The AAL2 SAR 102 or module performs the function as described in the ITU-T 363.2 standard, as is known in the art, the description of which is incorporated by reference herein. The AAL2 SAR 102 allows an associated residential router/gateway to support Voice over ATM.

The AAL5 SAR or module 105 performs the function as described in the ITU-T 363.5 standard. The AAL2 and AAL5 specifications (ITU-T 363.2 and 363.5) are hereby incorporated by reference herein in their entireties. The AAL5 SAR 105 allows the residential router/gateway to support data, Voice over IP, and video encapsulated in IP datagrams. Further, the AAL5 SAR 105 preferably supports up to 32 full-duplex connections (but can be scaled to several thousand connections) on which AAL5, and OAM traffic types can be configured. It should be noted that the ATM module 101 is configured to enable a user to turn-off the OAM processing in the ATM processor 120 such that the AAL5 module 105 then facilitates the transport of OAM cells to the network or host processor 190 (FIG. 1).

The AAL2 module 102 is configured in such a way that on transmit, signaling and layer management/packets can be inserted into the cell/data stream, while on receive the signaling and layer management packets can be extracted from the cell/data stream. This innovation allows dedicated DMAs to interface directly with the DSPs and the host processor 190. Hence, voice packets are fetched/forwarded from/to the DSPs, while signaling and layer management packets are fetched/forwarded from/to the host processor 190. Benefits over a system which utilizes the host processor for AAL2 processing (e.g. original solution of Telogy's Golden Gateway) include latency is minimized for voice packets since the host is circumvented, and system performance is increased since voice packets are not being duplicated across the system bus.

The Cell Buffer 104 (with priority queuing) is used by the ATM processor 120 to buffer ATM cells for certain switching applications. A need for cell buffering arises, for example, when the ATM processor 120 must switch cells from a high-speed port (e.g. ATM-25) to a low-speed port (e.g. xDSL). For example, in a VP cross-connect application, the xDSL router/gateway 100 is able to buffer bursts of ATM cells from the UTOPIA 108 interface before forwarding the cells to one of the ports on the Cell DMA I/F 106. ATM cells can also be buffered off chip (e.g. SDRAM) via the Cell Buffer 104. The Cell Buffer 104 is preferably implemented in hardware.

The Cell Buffer 104 can support multiple queues per xDSL port of the Cell DMA I/F 106. Preferably, the system supports at least two ADSL ports: fast and interleaved paths. The Cell DMA I/F 106 is basically a broadband port. All queues on the cell buffer 104 are independent. It is the firmware load which decides how queues are used. The ATM module 101 can then support priority queuing for the VP cross-connect (i.e. ATM25-to-xDSL and vice-versa, for example). The Cell Buffer 104 is configured by the host 190 at start-up with the number of queues supported, size of each queue, and a pointer to each queue. Further, the Cell Buffer 104 is operably configured with the intelligence to perform pointer manipulation.

The UTOPIA Level 2 module 108 can interface to either an ATM-25 network (the port is then a LAN port) or it could interface to an xDSL PHY (the port is then a WAN port). In the case when the UTOPIA Level 2 module 108 is a LAN port, the Cell DMA I/F module 106 will interface to a xDSL PHY and hence become the WAN port.

The ATM processor 120 is configured to enable VP cross-connect (i.e. switching), Quality of Service (QoS), and Operation and Maintenance (OAM) processing. An important responsibility of the ATM processor 120 is to fetch/forward ATM cells from/to ATM functions/ports.

There are at least two types of traffic flows supported by the ATM module 101; VC termination connections, and VP termination connection. A VC termination connection traffic flow is one in which the AAL5 105 or AAL2 module 102 constitutes one of its two ports and is terminated at the DSP or Host. An example of a VP terminated connection is when cells are switch between two ports (e.g. ATM25 to xDSL port).

ATM cells to be transmitted on one of the UTOPIA ports are forwarded by the ATM processor 120 to the UTOPIA module 108. Likewise, ATM cells received on one of the UTOPIA ports are fetched by the ATM processor 120. The UTOPIA module 108 provides an external UTOPIA Level 2 interface preferably supporting up to 4 PHYs (i.e. ports) but can be scaled to support up to 32 PHYS, and the module 108 interfaces to the ATM processor 120 via an Memory Bus slave interface.

Whenever the ATM processor 120 has a cell that needs to be transmitted out on one of the PHY ports, the ATM processor 120 writes the cell into the appropriate cell FIFO (ingress and egress ports interface to a cell FIFO). On transmit, a management device (UL2 master) is configured to enable a polling of the cell FIFO, checking for an entire ATM cell. If an entire ATM cell is available, the ATM cell is transmitted.

On receive, the UL2 master writes ATM cells into a cell FIFO based on the UTOPIA address lines. When an entire ATM cell is received, the UTOPIA module 108 notifies the ATM processor 120 that an receive cell FIFO needs to be serviced. The ATM processor 120 will fetch the ATM cell out of the UTOPIA module 108 and forward the cell to its destination port according to the ATM header information.

ATM cells to be transmitted on the WAN uplink (i.e. ADSL modem) are forwarded by the ATM processor 120 to the DSL or Cell DMA I/F module 106. Likewise, ATM cells received from the WAN uplink (i.e. xDSL PHY) are fetched by the ATM processor 120 and then forwarded to its destination port.

The Cell DMA I/F module 106 interfaces to the ATM processor 120 via an Memory Bus slave interface, and the DSL modem via XBUS, HPI or PCI. The module 106 preferably supports two ports (Port A and Port B).

A novel aspect of the ATM module 101, which utilizes an ATM processor 120 to fetch/forward ATM cells from/to ports (e.g. UTOPIA Level 2 port 108, Cell I/F port 106 etc.) and functions (e.g. AAL2 SAR 102, AAL5 SAR 105, Cell Buffer 104, etc.), allows for a function/feature rich ATM solution as well as enhanced system performance by reducing the overhead on the host. As previously mentioned, these functions can include ATM switching, Quality of Service (QoS), and operation and Maintenance (OAM) processing.

The aforementioned functions can be implemented in firmware running on the ATM processor 120. These functions and any other conceivable function is easily implemented since the ATM processor 120 "touches" every ATM cell transmitted or received. Since these functions can be implemented in firmware, the need for dedicated hardware and/or software running a network or host processor 190 is eliminated.

The ATM module 101 can not only support QoS for VC terminated connections, but also for VP terminated connections (i.e. connections setup to do VP crossconnect or switching). QoS or traffic shaping on VP terminated connections is achieved by using the Cell Buffer 104 in conjunction with switching function. For example, the Cell Buffer 104 can support a number of priority queues for each port. The ATM 120 processor determines the destination port and the priority of the ATM cell and forwards it accordingly to the Cell Buffer 104. The priority queues are then scheduled by the ATM processor 120. Whenever a credit matures for a priority queue, the ATM processor 120 fetches an ATM cell from the particular queue in the Cell Buffer 104 and forwards it to the egress port.

Further improvements on the system performance and the reduction of overhead on the host processor 190 is achieved by the architecture of the present invention by performing software intensive tasks, generally performed by the host processor 190, in hardware, such as CRC-32 calculation for AAL5, CRC-10 calculation for OAM cells, HEC calculation for ATM header, parity calculation for AAL2 PDUs, and CRC-5 calculation for AAL2 CPS packet headers.

ATM Processor

The flexible ATM processor 120 architecture enables the functions of switching, QoS, and OAM to be performed by a low-chip count, single module. Traditionally, these functions have been performed by dedicated hardware for each particular function (i.e. switching and Quality of Service) or software running on the host 190 (i.e. Operation and Maintenance).

Figure 3:
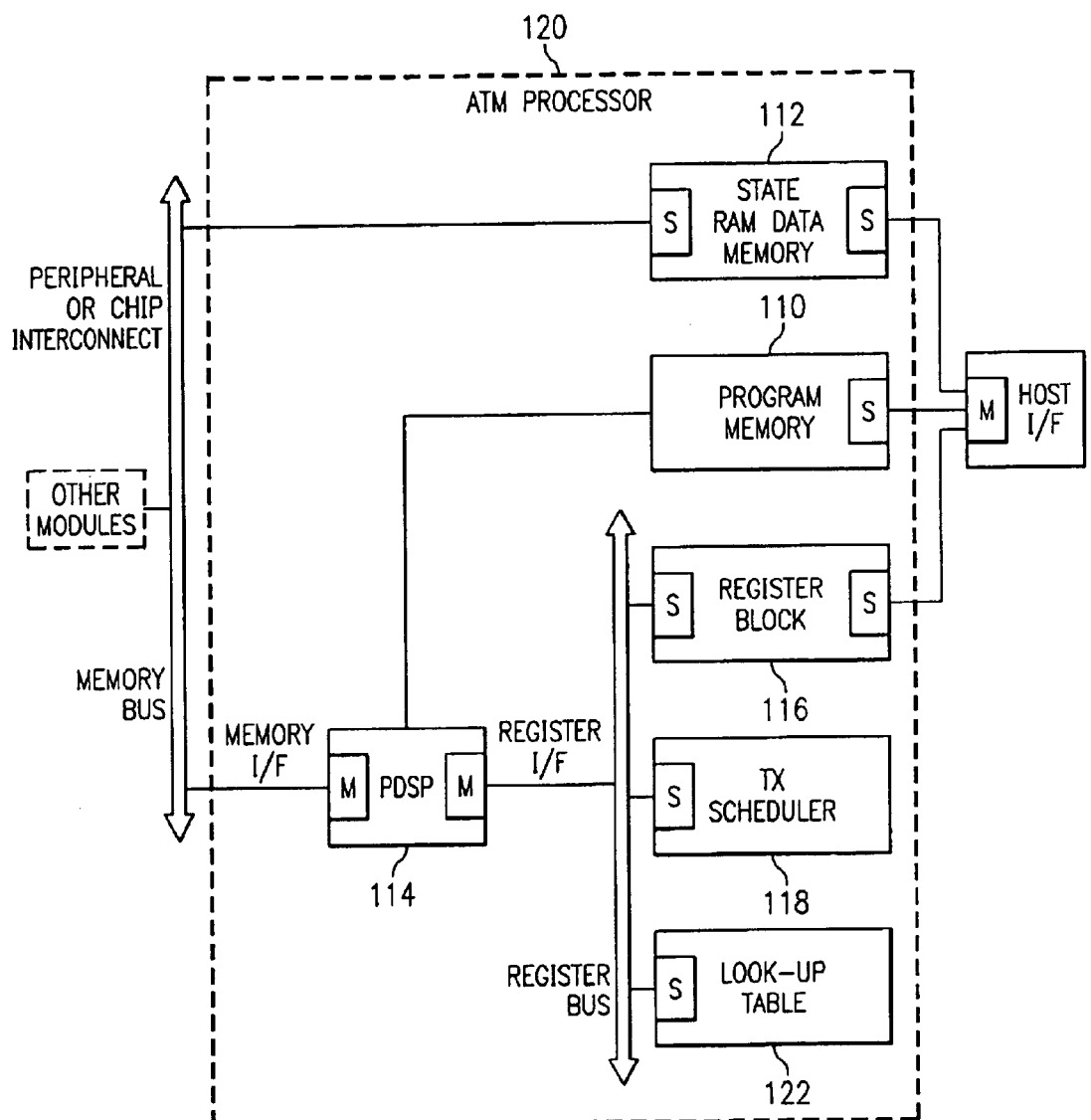
FIG. 3 illustrates a block diagram of an exemplary ATM processor in accordance with an embodiment of the present invention.

Referring now to FIG. 3 there is illustrated a block diagram of an exemplary ATM processor 120 in accordance with an embodiment of the present invention. The architecture of the ATM processor 120 includes the following functional blocks: Packed Data Structure Processor (PDSP) 114, Program Memory 110, Tx Scheduler 118, VPI/VCI Look-Up Table (LUT) 122, SAR/QoS RAM 112 and Register block 116.

Associated with the PDSP 114 are two peripheral interfaces (of which both are VBUS interfaces): Memory Bus and Register Bus. The PDSP 114 is basically a RISC core that can perform single cycle branches for efficiently manipulating packed data structures. The Tx Scheduler 118, LUT 122, and the Register Block 116 are located on the PDSP's Register Bus, where the PDSP 114 is the only master. The ATM processor 120 is connected via the PDSP 114 to a VBUS, for example, on which it is the only master. The slaves on the VBUS are the egress and ingress ports of the system as well as ATM functions (e.g. AAL5 SAR 105, cell buffer 104 etc). All the slave functions interface to the VBUS via FIFOs and the occupancy status of each FIFO is connected to a status register associated with the PDSP 114. The rest of the functional modules of the system sit on the PDSP's Memory Bus. The Register Bus and the Memory Bus are preferably two separate VBUS interfaces on the PDSP 114 and, hence, these two buses have two independent memory maps.

The PDSP 114 is the "brain" or processing element of the ATM processor 120, and executes firmware out of the program memory 110. The host 190 (FIG. 1) loads the instruction RAM 110 with the firmware at start-up via the host interface slave (S). By using a programmable element in the architecture, depending on the code load, systems can be tailored to individual customer. For example, a specific code load can enable VP cross-connect (i.e. switching), QoS, and OAM processing. Algorithms and functions supported in firmware can include QoS, ITU-T i.610, and ATM switching.

Figure 8:
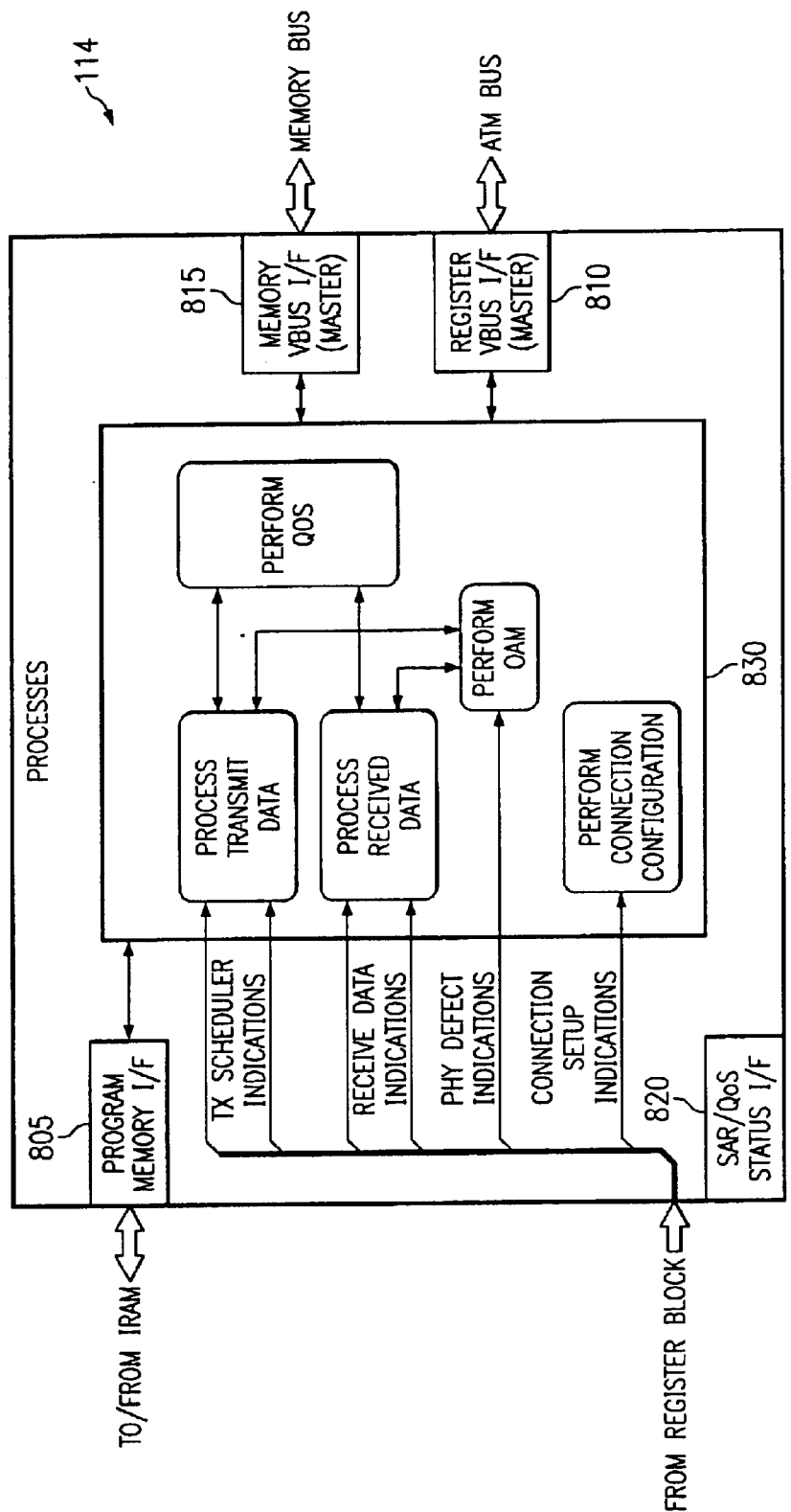
FIG. 8 illustrates a block diagram of a Packed Data Structure Processor, the programmable core of the ATM processor and its various interfaces in accordance with an exemplary embodiment of the present invention.

Referring now to FIG. 8 there is illustrated a block diagram of a PDSP 114 and its various interfaces in accordance with an exemplary embodiment of the present invention. The Program Memory interface 805 is used by the PDSP 114 to fetch instructions from the program memory. The Register Slave VBUS I/F 810 is used by the PDSP 114 to access the TX Scheduler 118, LUT 122, and Register Block 116. The Memory I/F 815 is used by the PDSP 114 to access cell FIFOs associated with the data ports as well as the Connection State RAM and data memory in the SAR/QoS RAM 112. The SAR/QoS Status I/F 820 enables the PDSP 114 to execute a round-robin polling of the events that can trigger some PDSP processing 830. PDSP processing 830 can include: processing transmit data and received data, and performing OAM, QoS and connection configurations.

Referring back to FIG. 3, the register block 116 has two VBUS Slave interfaces. Both the host 190 and the PDSP 114 can access internal registers for configuration and status through their respective VBUS interface. Logic is provided in the register block 116 which prevents the host from overwriting setup configuration information before the PDSP 114 has read it. The register block 116 also provides a location that is convenient for gathering status bits from various modules that are concatenated together and bussed to the PDSP 114. An interface from the host to the PDSP Instruction RAM 110 is also provided for Instruction RAM configuration and status (such as CRC results, etc.).

The register block 116 is used by the host 190, via the Host Interface Slave (S), to communicate connection setup and teardown notifications, and OAM configuration, for example. The host 190 can also acquire the ATM status information. The host can configure the ATM module 101, get statistics, as well as issue commands to the PDSP 114 via bus accesses.

The SAR/QoS RAM 112 includes the Connection State RAM and the PDSP Data Memory. While Data Memory is used as a scratch pad by the PDSP 114, the Connection State RAM contains the information about a connection, such as traffic type (i.e. AAL5, AAL2, or VP cross-connect), source & destination port, as well as information regarding the traffic contract. (The PDSP 114 uses the traffic contract information to perform QoS.)

The Connection State RAM enables the host 190, via the Host Interface slave (S) to configure each connection within the xDSL router/gateway 100. The host configures the connection parameters in the Connection State RAM prior to notifying of a connection setup. The configuration includes the destination and source port (i.e. between which ports the ATM cells are to be switched), VP translation information, Quality of Service parameters (e.g. cell rates to be used to program the Tx Scheduler 118), OAM configuration parameters. These parameters are used by the PDSP 114 when performing the functions of switching, QoS, and OAM.

The Tx Scheduler 118 provides dedicated hardware for the scheduling of ATM cell transmissions. The Tx Scheduler module 118 interfaces to the PDSP 114 via a slave interface on the PDSP's Register Bus. The PDSP 114 provides overall control of the scheduler hardware by writing scheduler command registers and the PDSP 114 is the direct recipient of all scheduler results via VBUS readable output registers and status bits connected to PDSP status register. Tx scheduler hardware frees the PDSP 114 from the heavy computational burden of performing low-level scheduling operations on high data rate ATM channels.

At any given time, the scheduler hardware can handle a maximum of 63 active channels. On a per-channel basis the PDSP 114 starts a series of cell transmissions for a DMA channel by giving the scheduler 118 the channel number and the desired cell transmission rate for that channel number. The PDSP 114 halts the transmission stream for a channel by commanding the scheduler 118 to stop that channel number. While the channel is active in the scheduler 118 (between the start and stop operations), the scheduler 118 periodically asserts a "channel due" signal at the channel's desired cell rate which indicates to the PDSP 114 that a cell should now be transmitted for the indicated channel number. The PDSP 114 requests an ATM cell to be transmitted on the DMA channel associated with the connection. When the cell is in the FIFO, the PDSP 114 will forward the cell to its destination port. (Note that the description above holds true for ATM connections which are VC terminated on the system. To support QoS on connections configured for switching or VP cross-connect, the ATM cells are fetched from an ingress FIFO and buffered in priority queues. The PDSP 114 services these queues when a credit is issued from the Tx Scheduler 118.) The PDSP 114 is thus kept in the loop, processing each and every scheduler "due". This gives the PDSP a fine-grained ability to suspend and restart cell transmissions based on channel data availability and, if desired, continuously adjust each channel's transmission rate in response to network congestion. The Tx Scheduler 118 and the VPI/VCI Look-Up Table 122 are configured by the PDSP 114 whenever a connection is setup or torndown.

The occupancy status of each FIFO is directly connected to a status register of the PDSP 114. The PDSP 114 is optimized to perform single cycle branches upon detecting a change in its status register. Hence, the ports on the VBUS can be serviced very efficiently by the PDSP. When the status of a FIFO's occupancy is 'not_empty', the PDSP 114 fetches the ATM cell and stores it in internal registers. The PDSP 114 first determines if the cell is an OAM cell followed by writing the ATM header (or portion of the ATM header in the case of VP cross-connect or F4 OAM cell) to the VPI/VCI LUT 122, and the result of a match and the index into state RAM is returned to the PDSP 114 or the result of 'no-match'. If the result is a 'no-match', then the cell is discarded. If the result comes back as a match, then the index is used to fetch the state information and the appropriate cell processing is performed and the cell is then forwarded to its destination port.

As previously mentioned, the VPI/VCI LUT 122 is generated and maintained by the PDSP 114. When a connection is setup, the VPI/VCI information is added to an address in Content Addressable Memory (CAM) and likewise when a connection is torn down the VPI/VCI information is deleted from the CAM. A LUT can be implemented as a RAM with PDSP enabled searching. The LUT 122 is accessed by the PDSP 114 via the Register Bus.

A look-up of a connection is performed when the PDSP 114 provides a VPI/VCI and issues a search operation to be performed on the CAM. The CAM will flag a hit, multiple hits or a miss. If a hit is flagged, the CAM will provide the address location containing the VPI/VCI. This address location is used as an offset or index by the PDSP 114 into the Connection State RAM of the SAR/QoS RAM 112, which contains information regarding the particular connection. The PDSP 114 can access the connections DMA information and traffic contract by using this address.

Since the functionality of switching, QoS and OAM is consolidated with the ATM processor 120, rather than having dedicated hardware for each function or the function being performed on the host 190.

Additionally, the ATM module 101 lends itself to easily implement switching or VP cross-connect since the ATM processor 120 fetches and forwards each ATM cell to and from the ports' FIFOs.

AAL5 Module

The AAL5 module 105 (FIG. 2) segments and reassembles AAL5-PDUs, as well as calculates the CRC-32 for AAL5-PDUs. The module interfaces to the host 190 via the Host interface and to the PDSP 114 via a Memory Bus slave interface.

Segmentation of an AAL5-PDU is performed when the Tx Scheduler 118 schedules a segmentation opportunity for a connection (i.e. DMA channel). (The DMA channel information is supplied to the AAL5 module 105 by the PDSP 114.) A DMA engine 201 will then fetch a cell from memory associated with the host 190, calculate the CRC-32 over the payload and write the cell into the cell FIFO. When the cell FIFO contains an entire cell, the PDSP 114 will fetch the cell and forward it appropriately.

On reassembly, the PDSP 114 performs the VPI/VCI look-up, writes the cell into the AAL5 module's cell FIFO and also indicates the channel. The reassembly logic accesses the channel states, calculates CRC-32 and transfers control of the cell to the DMA. When the cell FIFO contains an ATM cell, the receive DMA writes the cell into host memory reassembly logic initiates the receive DMA to perform end of packet (EOP) processing.

AAL2 Module

Generally, in a Voice over ATM solution (VoA), the phone or line is connected to a digital signal processor (DSP) via a codec. The DSP can support multiple phone lines. A primary function of the DSP is to perform signal processing. In the case of the a VoA system, the DSP captures digital voice samples from the codec for transmit and for receive gives the voice sample to the codec to be "played back."

The DSP transmits and receives packetized voice samples to/from a processing element or host (e.g. embedded or external processor). The voice samples are packetized in order to define the voice channel. The processing element performs the signaling in order to setup or teardown a voice session (i.e. phone call), layer management functions, and the AAL2 transmit and receive functions.

One disadvantage of this type of system is that data transmitted or received must be written on the system bus twice (once between the host processor and the DSP, and once between the host processor and the ATM transport hardware), resulting in system performance degradation. Another disadvantage is that very software intensive functions must be performed for AAL2 transmit and receive, such as CRC and parity calculation. Hence, a relatively powerful, host processor must he used compared to if the AAL2 transmit and receive function had been done in dedicated hardware. Because of at least the aforementioned disadvantages, this architecture also does not scale very well to dense voice solutions.

An aspect of the present invention enables the implementation of a hardware AAL2 transmitter which can interface directly to a DSP sub-system (which captures the voice samples) and a host (which performs AAL2 signaling and layer management functions) through a common interface. The AAL2 Transmitter is able to interleave AAL2 voice packets from the DSP sub-system and the signaling & management packets from the host on an ATM connection. The AAL2 receiver is able to extract voice packets and signaling and management packets from a received data stream.

The AAL2 module 102 supports VoA, using "Telogy's Golden Gateway" AAL2 solution. This means that the AAL2 module 102 reads/writes CPS-SDUs from/to a Tx/Rx FIFOs contained in or associated with the host 120 or DSP sub-system 160. The AAL2 module 102 supports the DSP (A or B) Rx/Tx FIFOs and host Rx/Tx FIFOs. The host Rx and Tx FIFOs can be used to support AAL2 signaling and peer-to-peer layer management. The module 102 interfaces to the host 190 via a Rx & Tx DMA engines' Host interface, and to the PDSP 114 via the Memory Bus slave interface.

AAL2 Transmitter

Figure 4:
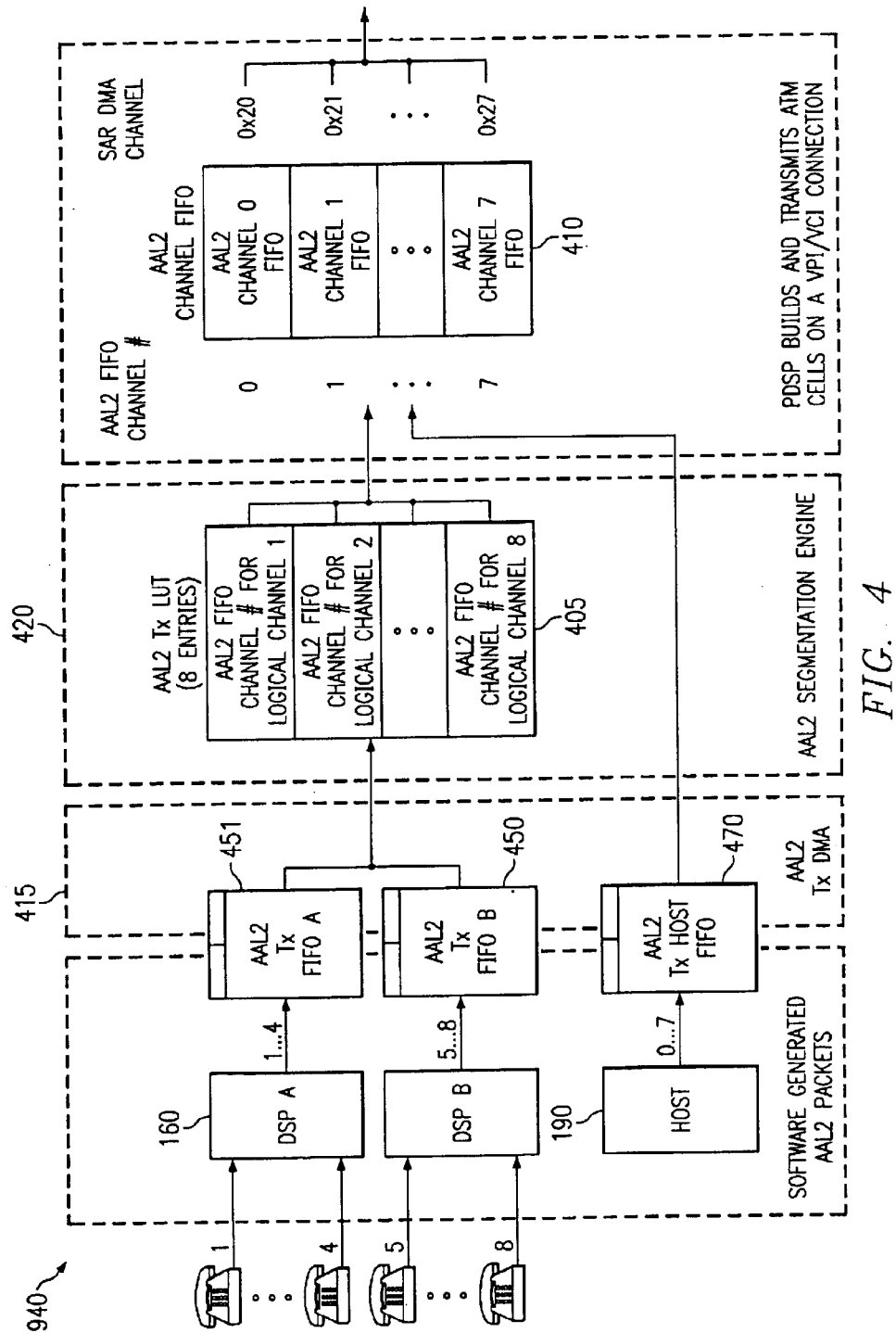
FIG. 4 a function block diagram of a AAL2 transmitter portion implemented in hardware in the AAL2 module in accordance with an exemplary embodiment of the present invention.

Referring now to FIG. 4 there is illustrated a functional block diagram of a AAL2 Transmitter portion 940 implemented in hardware in an AAL2 module 102 in accordance with an exemplary embodiment of the present invention. The transmitter portion 940 has two sets of AAL2 Tx DMAs 415 which are directly interfacing with the DSP(s) 160 and the host 190 processing element: DSP DMA(s)—fetches AAL2 voice packets from the DSP(s) 160, and a HOST DMA—fetches AAL2 signaling/management packets from the host 190.

The packets fetched by the DMAs 415 contains packet information which includes packet length, number of samples and channel identifier. FIG. 4 illustrates a set of two DSPs (A and B), however, the system can include only one DSP or more two DSPs.

The AAL2 Transmitter 940 has two sets of tables which get updated whenever the host 190 setup/teardown an AAL2 ATM connection or setup/teardown a voice session (i.e. phone call): AAL2 Channel Look-Up (LUT) 405, and DMA Channel State Tables 410.

The AAL2 Channel LUT 405 uses the DSP assigned voice channel as an index into the table in order to map a voice channel to the ATM connection. (An ATM connection gets mapped to a DMA channel on setup. Each DMA channel can only be mapped to one and only one ATM connection at a time.) The content of each entry in the table is an 'ON' bit and a pointer into the DMA Channel State table. The 'ON' bit specifies if a voice session is active or not. The pointer points into the DMA Channel State table. (Note that AAL2 multiplexing is achieved by configuring several or all entries to a single DMA channel.)

Each entry in the DMA Channel State table 410 contains an 'ON' bit, DMA channel specific information for that AAL2 connection such as the AAL2 sequence number and AAL2 PDU offset information as well as a pointer into the transmit buffer. The 'ON' bit specifies if this DMA channel has been configured. That is, if an ATM connection has been setup by the host 190 and mapped it to this DMA channel.

When a packet has been fetched by a DSP DMA, the AAL2 Tx module uses the packet channel identifier, which is the DSP assigned voice channel, as an index into the AAL2 Channel LUT 405 and makes sure the session is active. If the session is in-active, then the AAL2 packet is dropped and the host 190 is notified via an interrupt. If the session is active, the DMA channel pointer is used to access the DMA channel information from the DMA Channel State Table 410.

When the DMA Channel State information is accessed, the AAL2 Tx module verifies the DMA channel has been mapped to an ATM connection by checking the 'ON' bit. If the DMA channel is in-active, the AAL2 packet is dropped and the host is notified via an interrupt. If the DMA channel is active, the AAL2 Tx module will perform the AAL2 transmit function.

More specifically, the AAL2 packets are generated by DSPs 160 and/or the host 190. DSP A and DSP B each preferably support up to four voice lines (eight voice lines total). When an AAL2 packet is written by DSP A or B into the AAL2 Tx FIFO A or B (450, 451), it writes the logical channel # from 1–8 into the AAL2 buffer header's Logical Channel # field (in the LUT 405) corresponding to the voice channel (1–8) where the data originated. When an AAL2 packet is written by the host into the AAL2 Tx Host FIFO 470, it writes the AAL2 FIFO Channel # (0–7) into the AAL2 buffer header's Logical Channel # field in the DMA Channel State Tables 410. This is how the AAL2 module interleaves the voice, and signaling and management packets into the AAL2 data stream.

The AAL2 Tx DMA 415 is configured by the host with the Tx FIFOs Base Address and Tx Poll Count (A & B) and Tx Host FIFO Base Address and Tx Host Poll Count at initialization. The Tx Poll Timers are loaded with the corresponding value of the Tx Poll Count registers and decremented by one at every edge of the clock. When the Timers reaches zero, the DMA 415 will poll the corresponding Tx FIFOs (450, 451, 470). When polling the Tx FIFOs, the Tx DMA 415 will compare the write pointer against the read pointer of the FIFO, and determine if AAL2 data can be fetched. If AAL2 CPS-packets are available, then the DMA will read the packets contained between the read pointer and the write pointer. When all the packets are read out of the Tx FIFO, the Tx DMA 415 will update the read pointer (the Tx DMA only interrogates the write pointer, while it updates the read pointer.)

The Tx FIFOs A and B (450, 451) have higher priority than the Tx Host FIFO 470. CPS-packets are only fetched out of the Tx Host FIFO 470 whenever there is not data to fetch out of the Tx FIFOs A and B (450, 451). The reason for this is that voice samples are time sensitive, while signaling/layer management is not.

For AAL2 packets read from the Tx FIFO A or B (450, 451), the Segmentation Engine performs a look-up into the AAL2 Tx LUT 405. The entries in the LUT 405 are updated when the host software adds an AAL2 channel via the AAL2 Channel Configuration Register. The AAL2 Channel Configuration Register can be located in a separate module, however, it is logically located inside the AAL2 module 102. The Logical channel # is used as an index into the LUT 405 to determine the AAL2 FIFO channel # (0–7). NOTE: Some or even all entries in the AAL2 Tx LUT 405 may contain the same AAL2 FIFO Channel # in order to achieve multiplexing of several logical channels onto one VPI/VCI.

For AAL2 packets read from the Tx Host FIFO, the AAL2 FIFO 470 channel # read from the AAL2 packet header is used directly (the LUT 405 is bypassed or circumvented). This enables the host 190 to transmit AAL2 packets (for AAL2 signaling and peer-to-peer layer management purposes) before an AAL2 channel is set up.

The channel information supplied by the host 190 in the packet is instead a pointer into the DMA Channel State Table 410. Hence, the host 190 can independently determine which ATM connection to transmit packets containing signaling and layer management information. Note that since the AAL2 Channel LUT 405 is circumvented, the host 190 can perform signaling without any voice channel being active. For the host 190 to be able to transmit, an ATM connection must be setup.

The Segmentation Engine 420 then forwards the CPS-packet and byte-packs it into the appropriate AAL2 Channel FIFO. The ATM processor 420 then reads the CPS-PDU from that channel's FIFO, pads it if required, inserts the ATM header, and forwards the cell to its destination port when this DMA channel has been scheduled by the ATM processor. The VPI/VCI and destination port are determined from the connection information provided when the connection was set up (via the Connection VPI/VCI Register, Connection Configuration Register, and Connection State RAM).

In accordance with the present invention, an AAL5 SAR function is not needed since the signaling can be performed in AAL2. (A commonly used implementation of Voice over ATM solutions is to perform signaling on an dedicated ATM connection using AAL5 packet type). Further, the AAL2 transmit function can be performed in dedicated hardware, since the AAL2 transmitter allows the host to interleave AAL2 signaling and layer management packets in the transmit stream on any ATM connection. Hence, the required MIPS of the host 190 or embedded processor for the Voice over ATM solution is decreased.

The latency introduced, from the time the voice sample is captured by the DSP 160 until the AAL2 voice packet is transmitted out on the wire, is minimized due to the fact that the AAL2 transmitter 940 fetches the AAL2 voice packets directly from a FIFO associated with the DSP. Since the voice packets are not transferred multiple times across the system/peripheral bus, the system performance is maximized.

AAL2 Receiver

For ATM cells received on a connection configured for AAL2, an AAL2 Receiver verifies the parity and the sequence number of the AAL2 Start Field and then extracts the AAL2 CPS packet(s) contained in the ATM cell. However, a problem is "does the CPS packet need to be forwarded to the host or to the DSP"? Certain CIDs and UUIs are reserved for signaling and for layer management, but the standards are subject to change as this technology is fairly new. So hardcoding the CID which needs to be forwarded to the host is really not a viable solution.

An aspect of the present invention is to enable a hardware implementation of an AAL2 receiver to interface directly with a DSP sub-system (which will convert the digitized voice samples into voice signals) and a host (which performs AAL2 signaling and layer management functions). The AAL2 Receiver is able to filter the AAL2 signaling and management packets from the AAL2 voice packets using a host programmable CID and UUI filter.

Figure 5:
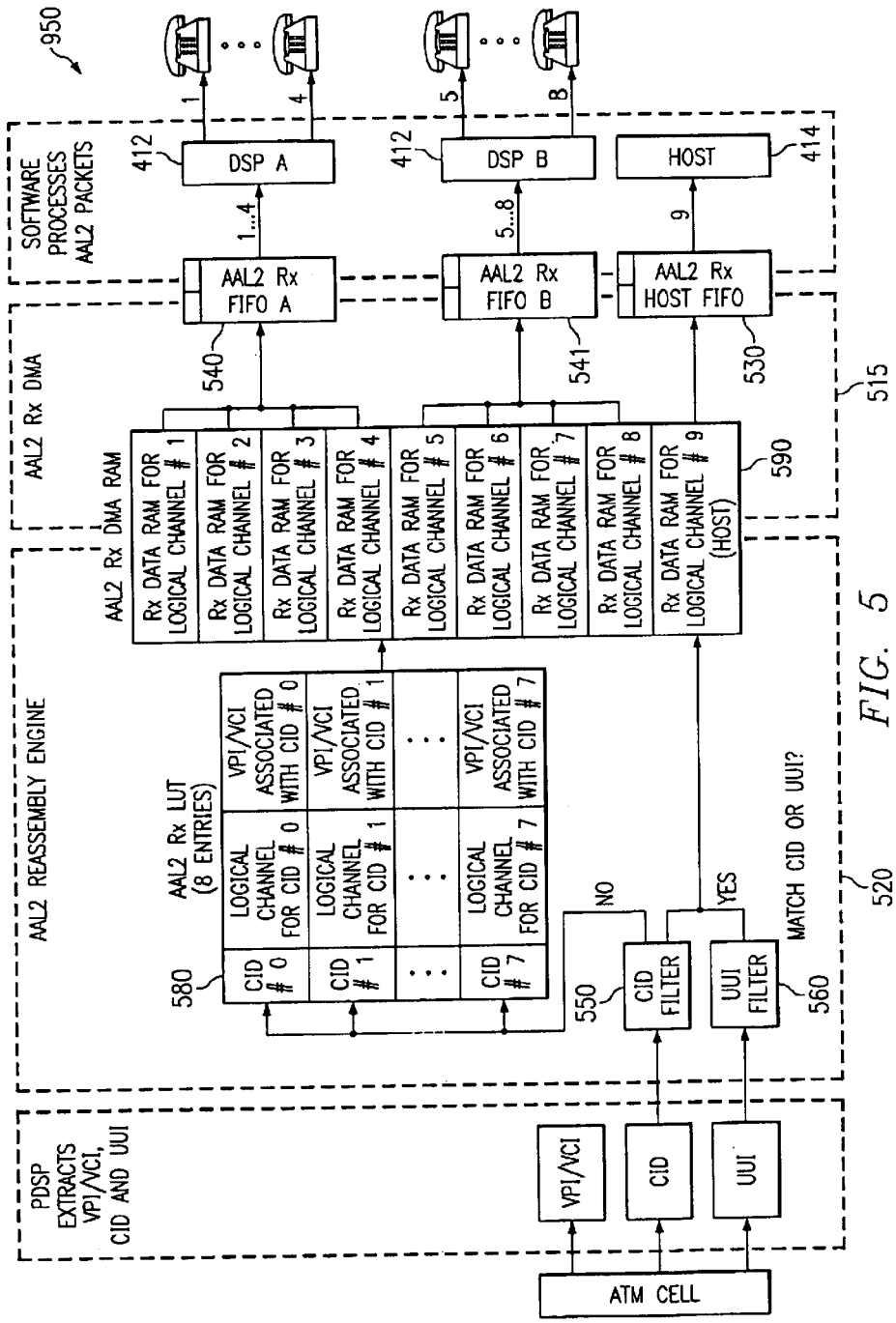
FIG. 5 illustrates a function block diagram of an AAL2 receiver portion in accordance with an exemplary embodiment of the present invention.

More particularly, referring to FIG. 5 there is illustrated a function block diagram of an AAL receiver 950 in accordance with an exemplary embodiment of the present invention. The AAL2 receiver 950 can be implemented in hardware in the ATM module 102. The AAL2 receiver 950 has two sets of DMAs associated with the AAL2 RX DMA 515 which are directly interfacing with the DSP(s) 160 and the host 190 (i.e. processing element): DSP DMA(s)—writes AAL2 voice packets to the DSP(s) 160 and HOST DMA—writes AAL2 signaling/management packets to the host 190.

When an ATM cell arrives on one of the SAR's interfaces, the ATM processor 120, via the PDSP 114, performs a VPI/VCI look-up. If the ATM processor 120 determines that the particular ATM connection is an AAL2 connection, CPS packets are extracted and forwarded to the AAL2 Cell FIFO. Subsequently, the CPS packet header is interrogated (HEC is checked) for CID and UUI filter matching.

The Reassembly Engine 520 checks the CPS packet header's HEC, and determines if the CPS-packet(s) should be forwarded to one of the DSPs (A or B) Rx FIFOs (540, 541) or the Rx Host FIFO 530 as follows. The AAL2 receive engine allows the host 190 to configure CPS-packets to be filtered to the host 190 on CID or UUI information. Hence, the host 190 can receive CPS-signaling packets and peer-to-peer layer management packets. If a match was made in the CID Filter 550, then the packet will be forwarded to the host 190 and the UUI Filter 560 is not interrogated. If no match was made in the CID Filter 550, the UUI Filter 560 is searched. If a match is made in the UUI Filter 560 the packet will either be forwarded to the Host DMA or discarded. (The UUI Filter has a feature that allows the host to discard packets based on the UUI.) Otherwise, if a CPS-packet's CID matches a CID in the AAL2 Rx LUT (LookUp Table) 580, the packet is forwarded to one of the 9 channels (8 voice channels and one host channel) in the Rx DMA RAM 590 according to the logical channel number associated with that particular CID. The entries in the LUT 580 are updated when the host software adds an AAL2 channel via the AAL2 Channel Configuration Register.

After the CPS-packet(s) have been encapsulated on an CPS-packet boundary, the AAL2 Rx DMA 515 will write the data into either Rx FIFO A 540, Rx FIFO B 541, or the Rx Host FIFO 530. By monitoring the FIFO's read and write pointers, the DSP 160 and host 190 can determine when CPS packets are available to them.

With the AAL2 receiver 950 of the present invention, an AAL5 SAR function is not needed since the signaling can be performed in AAL2 module 102. (A commonly used implementation of Voice over ATM solutions is to perform signaling on an dedicated ATM connection using AAL5 packet type.)

Further, communication between the functional blocks (i.e. DSP 160, Host 190 and AAL2 950) are minimized due to the fact that the protocol between the functions is drastically simplified with the AAL2 Receiver 950 directly interfaced with the DSP 160. Latency is minimized because of the direct connection to the DSP FIFO. The data is only written once across the system bus. An end result is overall improved system performance.

Cell Buffer Module

Data traffic in any given network is bursty in nature. That is, the pattern of Protocol Data Units (PDUs) over any given network segment or network interface will experience intervals of data traffic at line rate followed by intervals of virtually no data traffic. Well designed networking equipment (i.e. such as bridges, routers, and switches), which receives PDUs on a high-speed port and forwards/switches/routes the PDUs to a low-speed port, should not drop PDUs during the length of normal bursts.

In accordance with an embodiment of the present invention, a cell buffer is used to absorb the burst and hence assure no PDUs are dropped. Additionally, different data flows (e.g. connections for an ATM network) are assigned a priority. By assigning priority to the buffered PDUs, a system can support traffic shaping and Quality of Service (QoS), and hence utilize the bandwidth more efficiently. For example, in a temporarily congested ATM network, a connection carrying real-time data (e.g. such as voice) can be assigned higher priority than a connection carrying non-real-time data (e.g. FTP transfer). In the case of an ATM system, an ATM cell with a higher priority is buffered in a high-priority queue, while the lower priority ATM cells are buffered in a low-priority queue. The high-priority queue gets serviced ahead of the low-priority queue according to the ATM processor's firmware load.

Note that the example described above, which uses only two priority queues, describes a simple case using priority queuing. A system could have an arbitrary number of priority queues. In sophisticated ATM network equipment, such as an ATM switch, a priority queue is assigned to a specific traffic type (CBR, VBR, ABR, and UBR).

The ATM module 110 preferably includes eight logical I/O ports, from which the ATM processor 120 must fetch data from and forward data to. The ports can comprise four ATM-25 ports (i.e. the high-speed ports), and two cell-interface ports (i.e. these are used as the ADSL ports, and hence are the low-speed ports), as well as one AAL5 port and one AAL2. Since there are two ADSL ports in accordance with a preferred embodiment of the present invention, at least two queues need to be supported.

Figure 6A:
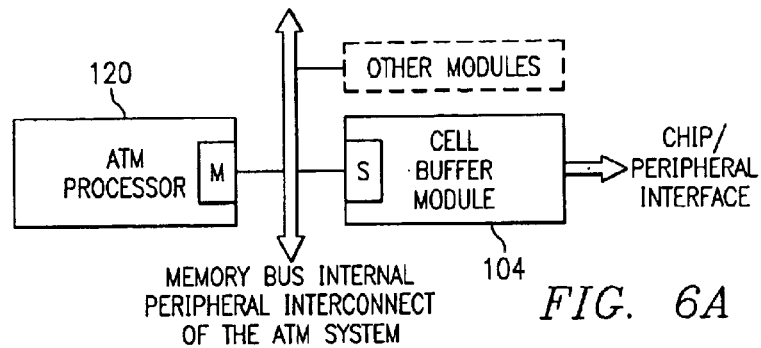
FIG. 6A illustrates a block diagram of a Cell Buffer module interconnect in accordance with an exemplary embodiment of the present invention.

Referring now to FIG. 6A there is illustrated a block diagram of an exemplary interconnect between the ATM processor 120 and cell buffer 104 in accordance with the present invention. The ATM processor 120 determines the destination port based on the ATM Header and, using the cell buffer 104, is able to buffer ATM cells during bursts on the ATM-25 ingress ports for example. Furthermore, the buffered ATM cells destined for an ADSL port can be differentiated by assigning different priorities. Hence, additional queues are needed per port in order to support priority based on some criteria. It should be noted that the cell buffer 104 can be used with other PDUs, not just ATM cells.

Figure 6B:
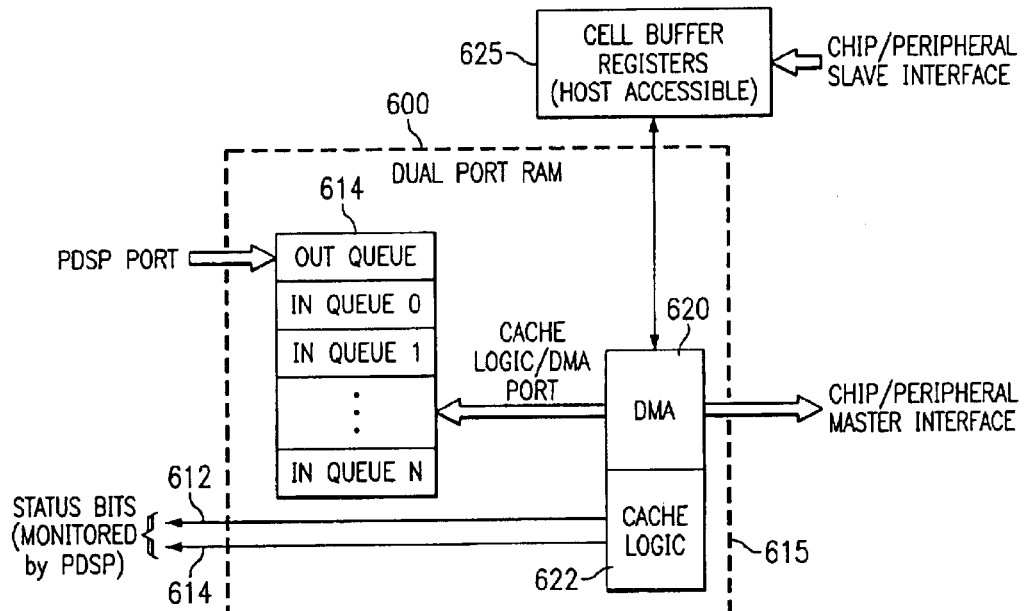
FIG. 6B illustrates a block diagram of a cell buffer module integrated priority cache in accordance with an exemplary embodiment of the present invention.

Referring now to FIG. 6B there is illustrated a priority cache 615 for use in the cell buffer module 104 in accordance with an exemplary embodiment of the present invention. The cache 615 preferably supports two ports with four levels of priority per port. However, the number of ports and levels of priorities can be scaled based on the system specifications.

Status signals 612 and 614 interface directly to the PDSP's status register. When the signals are asserted (set to high), the ATM Processor 120 is notified that cells are available to either be buffered (i.e. Cell Buffer OUT Queue is empty) or cells can be fetched and forwarded to the Cell DMA I/F (i.e. at least one of the ports' IN queues are not empty). When the IN queue status bit is set, the PDSP 114 reads the IN Queue Status register in order to determine which IN queues contain an ATM cell.

The memory of the Cache 615 is preferably a Dual-Port RAM, used as a cache between the PDSP 114 and SDRAM (located off chip) or other similar remote memory device, the SDRAM is accessible through the chip/peripheral interface. The cache 615 can be logically partitioned into a plurality of queue each queue containing N cells (RAM sized based on the application). The SDRAM (located off chip) or other similar remote memory device can be configured to include a dedicated queue corresponding to each of the plurality of queues in the Cache 615.

Figure 7:
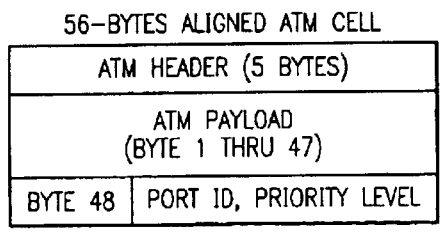
FIG. 7 illustrates an aligned ATM cell format with Port ID and priority in accordance with an exemplary embodiment of the present invention.

When an ATM cell needs to be buffered, the PDSP 114 writes the cell into the Cell Buffer Cache's OUT queue. The ATM cell contains certain port and queue information which is contained in the last three bytes of a 32-bit bounded ATM cell. This information is used by the cache DMA 620 to forward the cell to the correct queue. FIG. 7 illustrates an exemplary aligned ATM cell in accordance with the present invention.

Whenever a cell is written to or read from (either by the PDSP 114 or the to cache DMA 620) the Cache 615, the status of the cache queues is updated. The status of the Cache 615 is conveyed via the OUT Queue and IN Queue status signals 612 and 614 (interfaced directly to the PDSP's Status register interface) from cache logic 622 associated with the cache DMA 620. The OUT Queue status signal 612 is asserted when the OUT queue can accept an ATM cell, while the IN Queue status signal 614 is asserted when at least one queue on the Cell Buffer Cache 615 contains an ATM cell. For fetching an ATM cell out of the Cell Buffer 104, the PDSP 114 first interrogates the IN Queue status signal 614. If asserted, the PDSP 114 must reads the Cell Buffer Cache register 625 to determine which queue contains an ATM cell. The status information contained in this register 625 indicates to the PDSP 114 and the cache DMA 620 if an ATM cell can be moved.

Before a cell is written into the OUT queue of the cache 615, the PDSP 114 appends a Cache Queue ID into the last three bytes of a 32-bit bounded ATM cell. Since the transfers across the Memory Bus is performed in 32-bit words, the ATM cell resides in byte 1 through 53 while bytes 54, 55, and 56 are unused.

A Port ID and the Queue ID are used by the cache DMA 620 in its forwarding decision (i.e. which port and which queue the ATM cell belongs to). The Queue ID selects the priority queue of the ATM cell.

The cache DMA 620 services the OUT queue (i.e. cells to be buffered) and the IN queues (i.e. cells to be fetched) for all queues. This is accomplished by the cache DMA 620 moving ATM cells from the cache 615 out to the SDRAM (if the IN queues are full) as well as moving ATM cells from the SDRAM into the cache 615.

The cache DMA 620 uses internal queue pointers to determine if a cell can be moved from the OUT queue and into either an IN queue in the memory 614 or the external memory (e.g. SDRAM). The highest priority of the cache DMA 620 is to service the OUT queue contains a cell, the Port and Queue ID is interrogated then the cache logic determines if the cell is forwarded to the IN queue or SDRAM, or left in the OUT queue. The particular IN queue's cache occupancy is checked, and if cache queue is not full then the cell is immediately written into the IN queue in the cache 615. If the cache queue is full, then the cell is forwarded to the external queue in the SDRAM. Note that the cell is only forwarded to the external queue in the SDRAM if the IN queue in the cache 615 is full.

The cache DMA 620 is the master of the cells buffered in the external queues. If there is not a cell in the OUT queue and an IN queue in the cache 615 is not full, the DMA 620 moves a cell from the external queues into the cache 615. Thus, the IN queue associated with the cache 615 are fully occupied before the external queues are utilized.

The Cell Buffer Module 600 is configured by the host at start-up with the number of queues supported, size of each queue, and a pointer to each queue contained in the SDRAM.

The Cell Buffer Module 600 can be implemented in hardware and, therefore, is easily implemented and can virtually be "dropped" into any "system-on-a-chip". Further, the Cache 600 is scalable. That is, the module easily scales to a specific system requirement as far as number of ports & levels of priority supported, as well as PDU depth on the IN/OUT Queues. Also, priority assigned per queue is easily adapted since a priority algorithm is executed from the ATM processor 120 or switching engine.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A storing module for use in a communication network for buffering data, said storing module comprising:

a cell buffer unit having a first queue and a plurality of second queues operably configured to store protocol data units (PDU), wherein said first queue is further configured to receive a PDU from said communication network;

a cell buffer status indicator operably configured to issue a first queue status signal and a second queue status signal, wherein said first queue status signal indicates an occupancy status of said first queue and said second queue status signal indicates an occupancy status of said plurality of second queues;

a cell buffer controller operably configured to forward a PDU received in said first queue to one of said plurality of second queues, wherein said plurality of second queues include at least a high priority queue and a low priority queue and said forwarded PDU is forwarded to one of said high priority queue and said low priority queue in accordance with an appended PDU priority indicator, wherein said cell buffer controller is further operably configured to forward and fetch a PDU to and from a remote memory unit comprising a dedicated queue for each of said plurality of second queues.

2. The storing module of claim 1 further including a queue status register having an output operably configured to indicate a mapped location of a PDU buffered in said dedicated queue.

3. The storing module of claim 1, wherein said cell buffer controller is further operably configured to forward said PDU to one of said dedicated queues in said remote memory unit only when an associated one of said plurality of second queues is fully occupied.

4. The storing module of claim 1, wherein said cell buffer controller is further operably configured to fetch forward said PDU to one of said dedicated queues in said remote memory unit when an associated one of said plurality of second queues is occupied and when said associated one of said plurality of second queues subsequently becomes partially occupied.

5. The storing module of claim 1, wherein said cell buffer unit comprising a dual port random access memory.

6. The storing module of claim 1, wherein a PDU comprises an asynchronous transfer mode cell.

7. The storing module of claim 1, wherein said cell buffer unit comprising a single port random access memory.

8. The storing module of claim 1, wherein high priority comprises real-time data and low priority comprises non-real-time data.

9. A buffering system for use in a communication network for buffering data, said buffering system comprising:

a cell buffer unit having a first queue and a plurality of second queues operably configured to store protocol data units (PDU), wherein said first queue is further configured to receive a PDU from said communication network;

a cell buffer status indicator operably configured to issue a first queue status signal and a second queue status signal, wherein said first queue status signal indicates an occupancy status of said first queue and said second queue status signal indicates an occupancy status of said plurality of second queues;

a cell buffer controller operably configured to forward a PDU received in said first queue to one of said plurality of second queues, wherein said plurality of second queues include at least a high priority queue and a low priority queue and said forwarded PDU is forwarded to one of said high priority queue and said low priority queue in accordance with an associated priority indicator appended to said forwarded PDU;

a remote memory device having a dedicated queue for each of said second queues, wherein said cell buffer controller is further operably configured to forward and fetch a PDU to and from said remote memory device.

10. The buffering system of claim 9, wherein said cell buffer controller is further operably configured to forward a PDU received in said first queue to one of said dedicated queues only when an associated one of said high priority queue and said low priority queue is fully occupied.

11. The buffer system of claim 9, wherein said cell buffer controller is further operably configured to fetch a PDU from one of said dedicated queues when an associated one of said high priority queue and low priority queue becomes partially occupied.

12. The buffering system of claim 9, wherein said cell buffer unit comprises a dual port random access memory.

13. The buffering system of claim 9, wherein a PDU comprises an asynchronous transfer mode data cell.

14. The buffering system of claim 9, wherein said cell buffer unit comprises a single port random access memory.

15. The buffering system of claim 9 further including a queue status register having an output operably configured to indicate a mapped location of a PDU buffer in one of said dedicated queues.

16. A method of buffering protocol data units (PDU)s in a communication network, said method comprising:

issuing a first queue status signal indicating a ready status to receive a PDU from said communication network:

receiving said PDU in said first queue;

issuing a second queue status signal indicating an occupancy status of a plurality of second queues;

forwarding said PDU received in said first queue to one of said plurality of second queues comprising at least a high priority queue and a low priority queue in a local memory unit in accordance with a priority indicator appended to said PDU;

forwarding said PDU to a corresponding queue in a remote memory device when a select one of said plurality of second queues in said local memory device is occupied; and configuring said remote memory with a dedicated queue corresponding to each of said plurality of second queues in said local memory device.

17. The method of claim 16, further comprising fetching a PDU from said remote memory device for placement in a select one of said plurality of second queues when said select second queue becomes partially occupied.

18. The method of claim 16 further comprising fetching a PDU from said high priority queue for transmission to a communication port associated with said communication network prior to fetching a PDU from said low priority queue for transmission to said communication port.

19. The method of claim 16 further comprising mapping a memory location of a PDU buffered in said remote memory device.

20. The method of claim 16, wherein said PDU is an asynchronous transfer mode data cell.

* * * * *